Dec. 15, 1953  J. R. BOYLE  2,662,741
CONDENSER COOLING UNIT
Filed Sept. 13, 1948  5 Sheets-Sheet 3
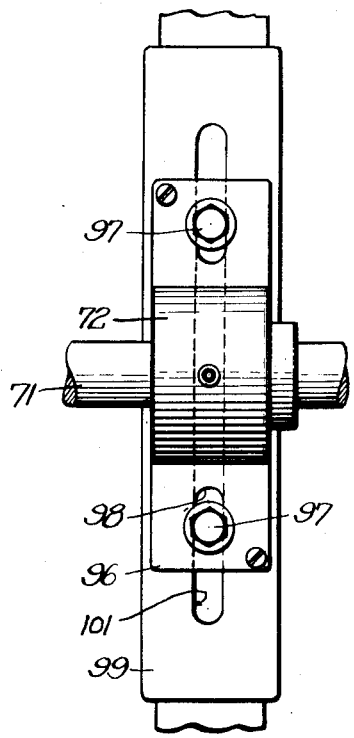
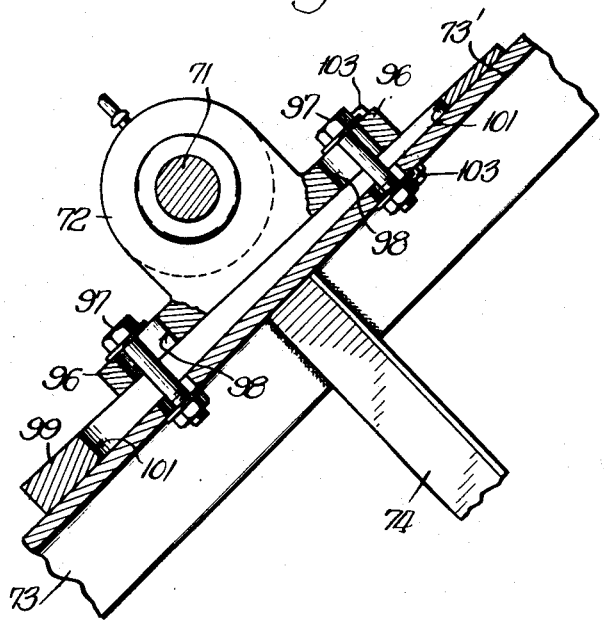
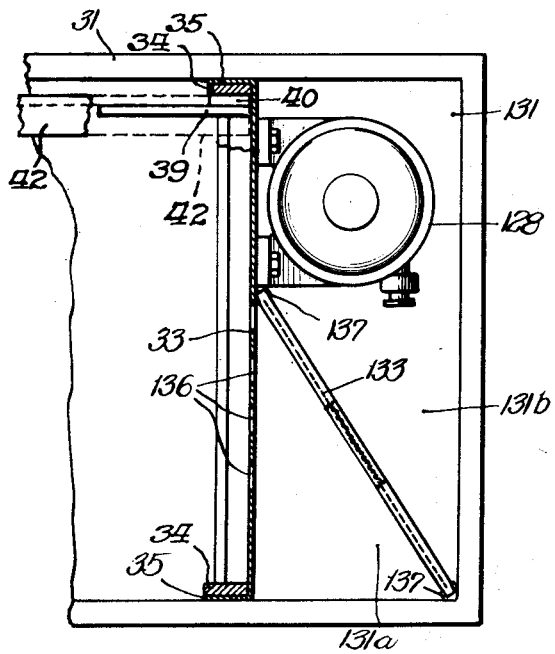
INVENTOR.
John R. Boyle,
BY Brown, Jackson,
Boettcher & Dienner
Attys.

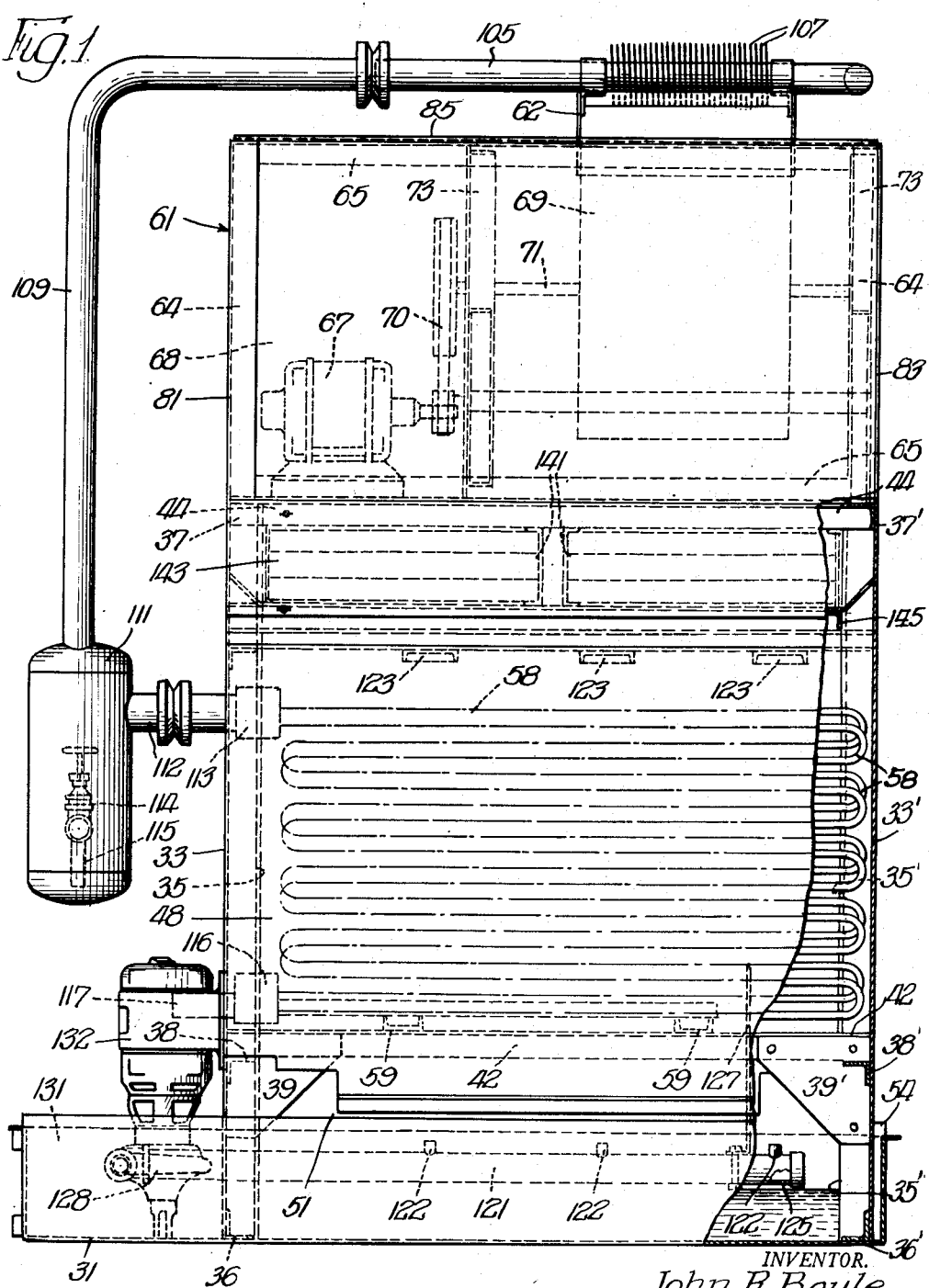

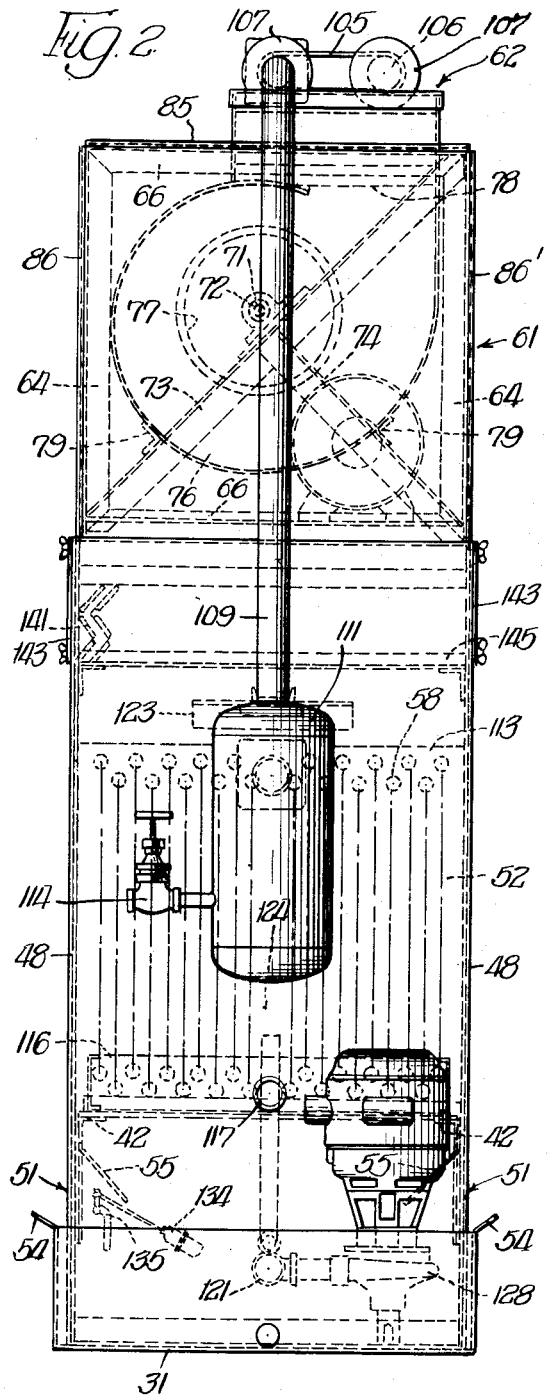
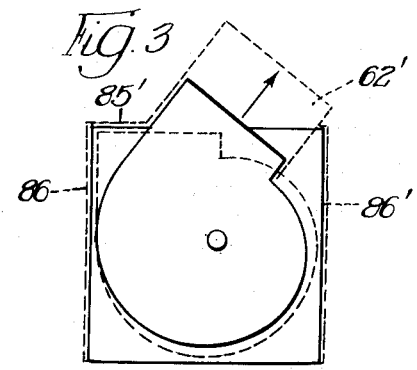
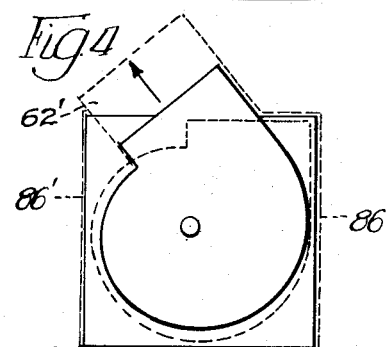
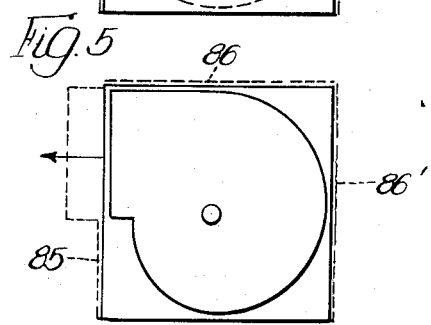
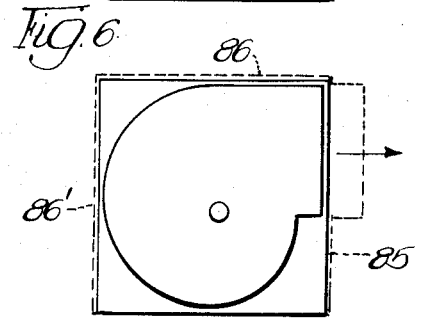

Dec. 15, 1953   J. R. BOYLE   2,662,741
CONDENSER COOLING UNIT
Filed Sept. 13, 1948   5 Sheets-Sheet 4

INVENTOR.
John R. Boyle,
BY Brown, Jackson,
Boettcher + Dienner
Attys

Dec. 15, 1953 J. R. BOYLE 2,662,741
CONDENSER COOLING UNIT
Filed Sept. 13, 1948 5 Sheets-Sheet 5
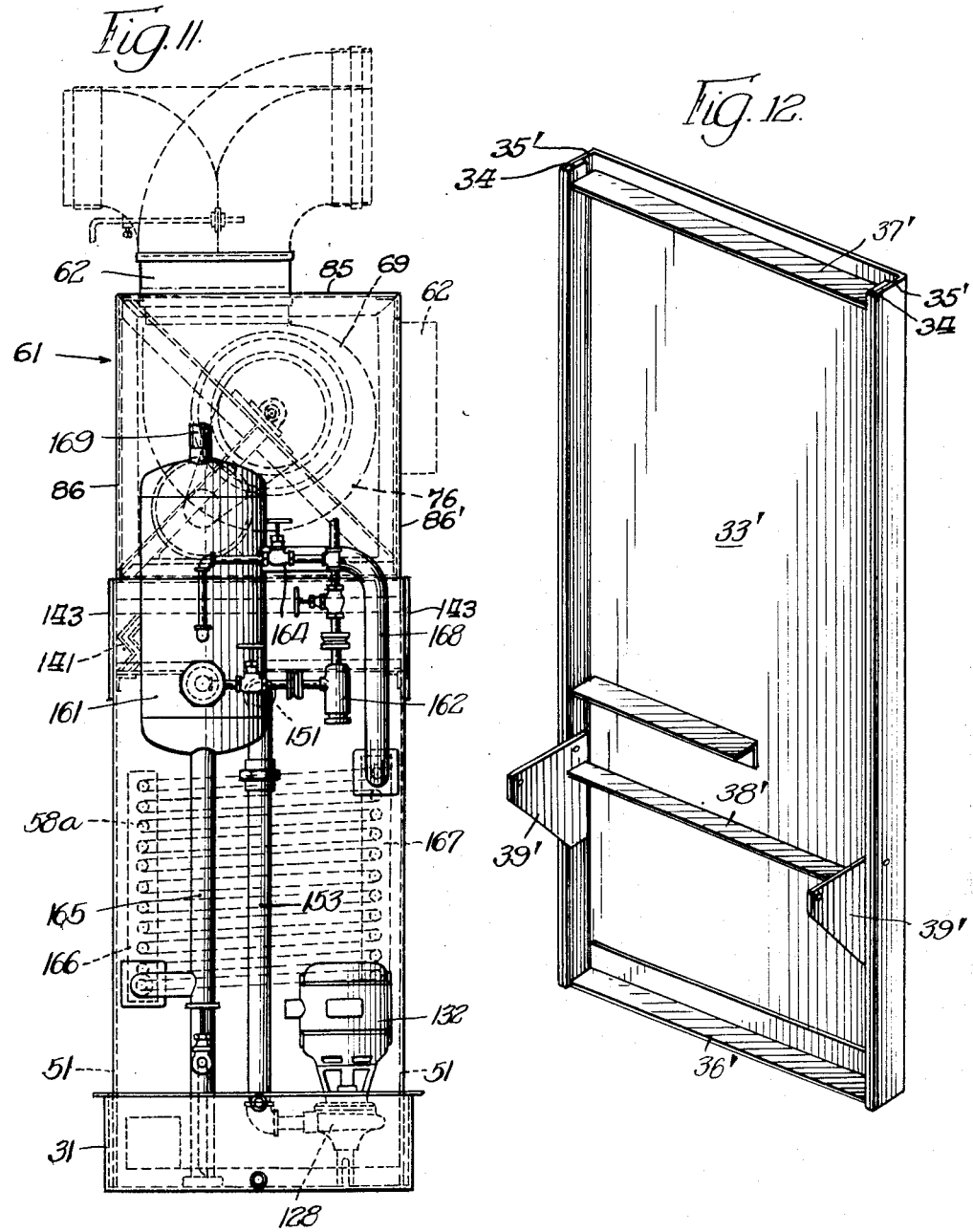
INVENTOR.
John R. Boyle,
BY Brown, Jackson,
Boettcher & Dienner
ATTYS.

Patented Dec. 15, 1953

2,662,741

UNITED STATES PATENT OFFICE 2,662,741

CONDENSER COOLING UNIT

John R. Boyle, Chicago, Ill., assignor to Buildice Company, Inc., Chicago, Ill., a corporation of Illinois Application September 13, 1948, Serial No. 48,951

13 Claims. (Cl. 257—57)

The present invention relates to a cooling unit designed to have general utility in the fields of refrigeration, air conditioning, industrial cooling of fluids, and the like. For example, many features of my improved cooling unit can be embodied either in evaporative condenser cooling units for condensing refrigerating gases, or in air cooling units of the spray type, or in air cooling units of the dry type. In fact, one of the features of the invention resides in providing a fundamental or basic design for the above three types of units, so that by the mere addition or substitution of certain appropriate parts or individual equipment this basic design becomes an evaporative condenser cooling unit, or a spray type cooling unit, or a dry type cooling unit.

The basic design is also flexible in the sense that greater capacity can be obtained largely by the mere addition of unit parts. For example, if it is desired that the evaporative condenser unit, or the spray type cooling unit, or the dry type cooling unit, be of relatively small capacity then a single fan or single blower is used in the air discharge sub-assembly. However, if a larger capacity is desired then the fan assembly has two blowers or three blowers, and an appropriately larger motor. Correspondingly, the other parts of the construction, such as the main frame, housing panels, cooling coils, etc. would then be assembled with additional units or in appropriately larger units to accommodate the greater capacity of the two-fan sub-assembly or the three-fan sub-assembly, but the same basic design would remain in these different capacity units.

The basic design comprises a bottom pan constituting a supporting base for the entire unit, from which pan rises a main frame of rectangular outline, built up of reenforced end plates and longitudinally extending side angle bars, which main frame carries sheet metal side panels to define a single pass vertical chamber through which the air passes upwardly for contact with the cooling coils within the chamber. The air enters the lower end of said chamber through large air intake openings defined between the top edge of the bottom pan and the adjacent lower edges of the side panels. The air passes upwardly through said chamber and is discharged from the unit either by a one-fan, two-fan or three-fan sub-assembly which is mounted on top of the main frame. The discharge may be either to a duct system or to a room area, or out-of-doors.

One of the particular features of the invention resides in the ability to mount this fan sub-assembly in any one of several positions on the main frame for adapting the unit to different air discharge conditions or different access conditions. For example, the fan sub-assembly can be mounted in any one of three different positions for obtaining either a top air delivery, a front air delivery or a back air delivery. Similarly, for better access to the electric motor compartment of the fan sub-assembly, or for better access to the lubrication facilities of the sub-assembly, this entire fan sub-assembly can be turned end for end in its mounting on the main frame, so that the motor end thereof can be disposed either at the front end or at the back end of the main frame.

Another feature of this motor and fan sub-assembly resides in the improved adjustable bearings for supporting the fan shaft. These bearings employ an improved shiftable wedge feature which enables the bearing axis to be shifted up or down or in or out with respect to the frame member on which the bearing is supported. After the bearings have been adjusted to secure the correct alignment between the shafts of adjacent fans the bearings may be permanently locked in position on the frame supporting bars. It will be evident that this bearing adjustability is of particular importance in the larger units employing two or three fans or blowers all mounted in end to end alignment in the fan sub-assembly. This bearing adjustment can be performed at the point of manufacture, and the fan sub-assembly then shipped as a complete unit ready for mounting on the main supporting frame.

In this regard, another feature of the basic design is that it is of an improved knock-down type permitting ease of moving and of assembly on the site of location, and of reassembly if relocation is necessary. Complete assembly of the unit does not need to be performed in a shop, nor does it require shop facilities.

Another feature of the invention resides in an improved spray system for use in the evaporative condenser or in any other unit utilizing a spray discharge. Instead of relying upon relatively fine spray apertures for obtaining atomization, I employ relatively large spray apertures in my new spray system and project relatively large streams of water from the large spray apertures against diffusing or scattering plates with sufficient velocity to break up the stream flow into a finely atomized spray or mist. Preferably, the spray nozzles are located below or near the lower portions of the cooling coils and are arranged to project their streams upwardly substantially vertically between laterally spaced banks of coils so as to impinge against these diffusing plates or targets located above the coils. These diffusing plates are shaped to produce a distributed and directed atomization, so that the finely atomized spray precipitates down over the coils in a distributed pattern so as to give a substantially uniform distribution or density of spray over a relatively large area of coil surface. In my improved system, the spray apertures are so large that it is practically impossible for them to become clogged by suspended impurities carried through the water system. Furthermore, in view of the fact that the spray nozzles or jets point in an upward position it will be seen that when the spray system is shut down the drainage will occur in a downward direction through these spray apertures back into the spray header, rather than from the header out through the apertures such as is the case when the spray apertures discharge downwardly or laterally. The downward drainage back through the spray apertures and into the spray header is augmented by providing a bottom bleeder hole in the header so that any foreign matter in the water will wash out through this bottom bleeder hole. As a result of these features, I obtain a non-clogging spray system, and thereby eliminate one of the most bothersome objections in spray systems generally. Also, by virtue of the drainage feature through the bottom bleeder hole in the spray header the system is made self-draining, eliminating the possibility of freeze-up.

Another feature of my improved spray system resides in having the centrifugal pump submerged below the water level in the bottom pan so that this pump will always have a self-priming action. It will be understood that this latter feature can also be employed in overhead nozzle spray systems as well as in diffusion plate spray systems.

Another feature of my improved spray system is the location and arrangement of the straining screen through which the water or brine in the bottom pan must pass in flowing to the intake of the submerged centrifugal pump. This screen is located entirely outside of the confines of the main housing assembly so that it can be lifted out of its normal position for cleaning purposes without having to get into the housing assembly or under the housing assembly. In this position disposed beyond the confines of the housing assembly, the dirty side of the screen is always visible to the attendant looking down at that end of the unit, which gives greater assurance that the screen will be cleaned regularly.

Another feature cooperating with the spray system is the provision of high velocity air intake openings into the spray chamber, whereby any splashing caused by the spray water striking the surface of the water in the pan is prevented from splashing outwardly because of the high velocity inflow of air through these air intake openings. These high velocity intake openings are defined between inwardly sloping baffles at the lower edges of the side cover sheets and outwardly sloping baffles extending along the side edges of the pan, as will be later described in detail.

Another feature of the invention having particular application to the evaporative condenser type of unit is the provision of a top cooling coil disposed in the path of the air discharge from the fan sub-assembly, this top coil serving to precool the refrigerating gases before they enter the main cooling coils in the spray chamber. This upper coil can be used as a desuperheater for removing or reducing superheat from the refrigerating gases before they enter the main cooling coils in the spray chamber. This upper coil functions at all times as an oil separator for condensing oil vapors in the refrigerating gases so as to bring about the separation and reclaiming of these oil vapors in the oil separator which is connected to the outlet of this top coil.

Another feature of the invention resides in the provision of improved eliminators which are made readily removable for easy cleaning.

Another feature of the invention resides in an improved lubrication system for simplifying lubrication of the fan shaft bearings, motor bearings, etc.

Other features and advantages of the invention will be apparent from the following detail description of certain preferred embodiments of the invention. In the accompanying drawings illustrating these embodiments:

Figure 1 is a side view, partly in elevation and partly in section, showing the evaporative condenser embodiment of my invention, this unit being of a smaller size having only a single fan or blower in the fan sub-assembly;

Figure 2 is a front end view of this evaporative condenser embodiment;

Figures 3, 4, 5 and 6 are diagrammatic views illustrating how the fan and motor sub-assembly can be variously positioned for obtaining a top discharge, a front discharge, a back discharge and also diagonal discharges forwardly or rearwardly;

Figures 7 and 8 are plan and cross-sectional views of one of the adjustable fan shaft bearings;

Figure 9 is a fragmentary plan view of one end of the unit showing the location of the straining screen;

Figures 10 and 11 are side and end elevational views of a spray type air cooling embodiment of my invention; and Figure 12 is an isometric perspective view of one of the reenforced end plates of the frame structure.

Figure 10:
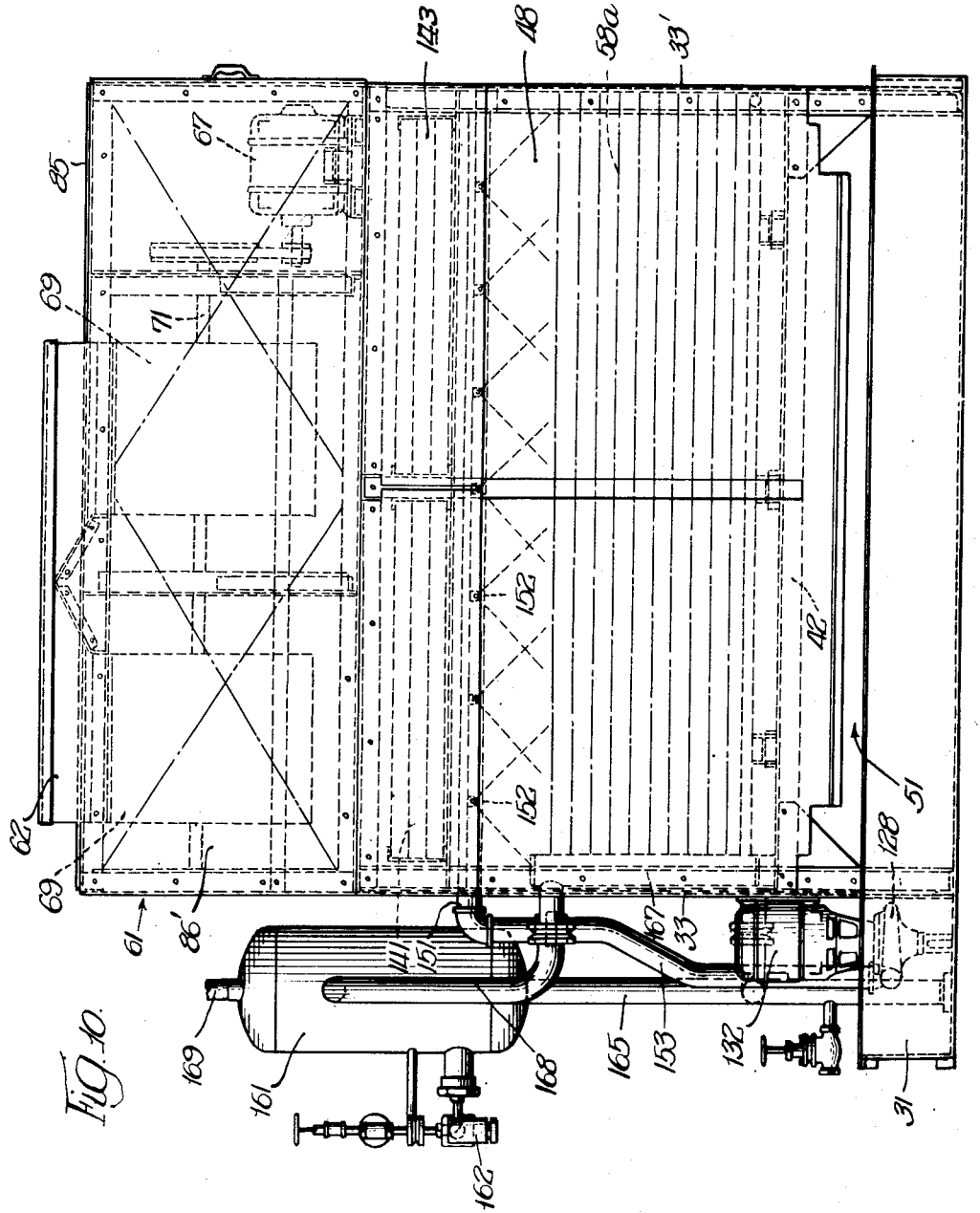

Referring first to the evaporative condenser embodiment shown assembled in Figures 1 and 2, the aforementioned basic design comprises the bottom pan 31 which is adapted to receive spray water and which constitutes a supporting base for the entire unit. This pan or spray water tank is constructed of heavy gauge sheet metal and is preferably of long rectangular outline.

The main frame structure of the cooling chamber comprises two end plates 33, 33' defining the front and rear ends of the frame. These two end plates are identical, except that the front plate 33 has appropriate holes therethrough for the cooling coil connections, spray pipe connections, water transfer holes, etc. These end plates 33, 33' are formed out of heavy gauge sheet metal suitably reenforced to enable these end plates to function as main frame supports. As shown in Figures 9 and 12, part of this reenforcing consists in bending vertical stiffening flanges 35, 35' inwardly along the vertical side edges of the plates. If desired, these flanges may be reenforced by bars 34 welded along their inner surfaces. In addition, this reenforcing comprises horizontally extending bottom angle bars 36, 36' welded across the bottom inner edges of the end plates, and horizontally extending upper angle bars 37, 37' welded across the upper inner portions of the end plates. The transverse bottom angle bars 36, 36' rest upon the bottom wall of the pan 31, and the transverse upper angle bars serve to stiffen the upper portions of the end plates, and to aid in supporting the upper fan section, etc. Horizontally extending intermediate angle bars 38, 38' are also welded across the inner sides of both end plates at an intermediate level to assist in supporting the longitudinal side frame bars, to be later described. Associated with these intermediate angle bars 38, 38' are triangularly-shaped gusset plates 39, 39' which are welded to the inside surfaces of the vertical edge flanges 35, 35' or of the bars 34, as shown in Figure 9, spacer plates 40 are interposed between the gusset plates and the vertical edge flanges 35, 35' in the welding operation, so that the upper edge of each gusset plate is spaced inwardly from the adjacent inner surface of the flange 35, 35', whereby to form a pocket between the upper portion of each gusset plate and the adjacent flange to receive the downwardly extending flange of the longitudinally extending frame bar 42. One of these longitudinally extending frame bars 42 is disposed at each side of the frame structure, these bars being of angle bar section. The vertical flange of each longitudinal bar 42 rests upon the upper horizontal flange of each intermediate cross bar 38, 38', and this vertical flange of this longitudinal bar also fits down into the aforementioned pocket between each gusset plate and the adjacent edge flange 35, 35'. The longitudinal bars 42 are then secured to the gussets by clamping bolts passing therethrough. The upper portions of the reenforced end plates 33, 33' are also tied together longitudinally by an upper pair of longitudinal frame bars 44 having their ends bolted near the vertical stiffening flanges 35, 35' of the end plates.

The above described parts of the basic design are adapted to be shipped in knock-down kit form to the place of assembly. Here, the base pan 31 is set in place, and thereafter the two reenforced end plates 33, 33' are set up in the pan in their proper positions. As previously described, the bars 36, 37 and 38 and the gusset plates 39 are welded to these end plates, and hence the end plates are shipped in this assembled form to the point of use. The erection of this main frame structure then merely requires the bolting of the lower longitudinal bars 42 and upper longitudinal bars 44 to the upright end plates 33, 33'. The coil assembly is then placed in position between the end plates, together with any spray nozzle assembly if used, and thereafter the sheet metal side covers 48 are bolted or screwed to the outer sides of the vertical stiffening flanges 35, 35' of the reenforced end plates. The lower edges of these side covers 48 terminate short of the top edge of the base pan 31, so as to define air inlet openings 51 at each side of the unit. In the evaporative condenser embodiment of the invention a vigorous spray operation takes place within the cooling chamber 52, and in such embodiment I associate deflecting baffles with the air inlet opening 51 for preventing any of the spray from being projected outside of the unit. These baffles comprise upwardly and outwardly extending baffle flanges 54 extending from the side edges of the pan 31 (Figure 2), and also comprise inwardly and downwardly sloping baffle walls 55 extending down from the side cover sheets 48. These cooperating pairs of baffles 54 and 55 define high velocity air intake openings 51 therebetween, whereby any splashing caused by the spray water striking the surface of the water in the pan 31 is prevented from splashing outwardly, owing to the high velocity inflow of air through these air intake openings. The main coil assembly is designated 58 in its entirety, and this coil assembly is supported on transverse channels 59 (Figure 1) which have their ends resting on the lower longitudinal frame bars 42.

Referring now to the details of the fan and motor sub-assembly indicated in its entirety at 61, this unit comprises a box-like, angle-iron frame including vertical bars 64, longitudinal bars 65 and transverse bars 66 all welded together. An electric motor 67 is mounted in a motor compartment 68 at one end of the fan sub-assembly 61. The motor drives one or more fans 69, which are preferably of the centrifugal blower type. The drive is preferably a belt drive, using a plurality of V-belts 70 operating side-by-side over V-belt pulleys on the motor shaft and on the fan shaft. The motor has a shiftable base mounting to provide for adjusting belt tension. In the smaller capacity units only one blower is employed, but in the larger units two or three of these blowers are mounted side-by-side with their impellers all mounted on a common fan shaft 71. These blowers are all preferably of the same size. The blower shaft is mounted in the aforementioned adjustable bearings 72 which are supported on diagonal frame bars 73 extending between diametrically opposite corners of the sub-assembly frame. Each diagonal bar 73 is reenforced by a diagonal brace bar 74 extending from an intermediate point of the bar 73 to one of the other corners of the frame. The blower housing 76 is of a conventional form, having the usual side inlet openings 77 and tangential discharge opening 78. Longitudinal angle bars 79 extending longitudinally of the sub-frame and having bolted attachment to the angle bars 66, 73 and 74 serve to hold the fan housing 76 in its proper position in the sub-frame. These longitudinal angle bars 79 can be unbolted and shifted to other positions for enabling the blower housing or housings 76 to be rotated to other angular positions within the sub-frame structure 64, 65, 66 (Figures 3 and 4).

Referring now to the outside housing of this fan sub-assembly, the motor end of the sub-frame is closed by a removable end plate 81 which can be readily removed by the release of wing nuts in order to obtain ready access to the motor 67 and to the lubricating facilities at this end of the sub-assembly. The other end of the unit is closed by an end sheet 83 which may or may not be removable, as desired. That side of the sub-frame through which air discharge occurs is provided with a discharge cover sheet 85 through which extends an air discharge duct 62 having communication with the fan outlet 78 at its inner end. This cover sheet 85 remains secured to the sub-frame in most of the different positions of the fan sub-assembly. For the three remaining sides of this sub-frame, there are provided two cover sheets 86, 86' adapted to be placed on the two remaining open sides of the sub-frame, irrespective of which way the sub-frame is mounted on the main frame. These different angular positions are illustrated in Figures 3, 4, 5 and 6. Figure 3 illustrates the air discharge tilted diagonally upwardly and toward the right, such being obtained by rotating the fan housing 76 to a tilted or angular position within the sub-frame. For this tilted position, a special discharge cover sheet 85' is employed having a tilted air discharge duct 62'. The two cover sheets 86, 86' then close the two vertical sides of the fan assembly. Figure 4 shows this diagonal discharge occurring upwardly and toward the left instead of toward the right. This arrangement is obtained by merely turning the entire fan sub-assembly 61 end-for-end so that the motor end of this sub-assembly is at the back end of the main frame instead of the front end. Figure 5 shows the air discharge occurring substantially horizontally toward the left. This arrangement is obtained by tipping the entire sub-frame 64, 65, 66 through 90°, so that the air discharge panel 85 now constitutes the left hand panel for the fan unit. The other two panels or side plates 86 and 86' are then placed across what are now the top and right hand sides of the fan unit. Figure 6 illustrates a horizontal discharge toward the right. This arrangement is obtained by merely turning the fan sub-assembly 61 end-for-end upon the main frame, so that the discharge outlet 62 points toward the right instead of toward the left. As previously remarked, the discharge outlet or outlets 62 may be arranged to discharge to a room area, or out-of-doors, or may be connected to a duct system.

Referring now to the details of the adjustable bearings 72 for the fan shaft 71, it will be seen from Figures 7 and 8 that each bearing 72 has bolting lugs or pads 96 for receiving clamping bolts 97 which extend down through the lugs or pads 96 and through the lateral supporting flange 73' of the diagonal angle bar 73 supporting that bearing. The bolts 97 pass through elongated slots 98 formed in the base lugs 96, which slots enable the bearing to be shifted sidewise in the direction along the length of the angle bar 73. Interposed between the base lugs 96 and the mounting flange 73' of the angle bar is a relatively long adjusting wedge 99 having a lengthwise slot 101 therein. The clamping bolts 97 pass through this long slot 101. The provision of the slot 101 permits the wedge to be shifted upwardly or downwardly along the length of the diagonal angle bar 73 so as to cause outward or inward displacement of the bearing 72 in a direction at right angles to the angle bar 73.

It will be seen from the foregoing that with the clamping bolts 97 loosely assembled in place, the bearing 72 can be shifted upwardly or downwardly along the length of the diagonal angle bar 73 so as to effect alignment adjustments in this direction; also that the adjustable wedge 99 can be shifted upwardly or downwardly along the length of the angle bar relatively to the bearing for the purpose of shifting the bearing outwardly or inwardly relatively to the angle bar, so as to effect alignment adjustments in that direction. Having established the proper alignment adjustments in both directions, the bolts 97 are then tightened to lock the bearing in its adjusted position. If desired, a greater permanency of position can be obtained by then drilling holes through the bearing lugs 96, wedge 99 and flange 73' and passing locking pins or bolts 103 down through these drilled holes to prevent accidental loosening and shifting of the bearing.

In the evaporative condenser embodiment of the invention shown in Figures 1 and 2, refrigerating gases may be conducted directly to the main coil assembly 58 within the cooling chamber 52, although in one preferred embodiment of the invention I arrange to have the refrigerating gases pass through a precooling coil 105 before entering the main coil assembly 58. This precooling coil is disposed adjacent the fan assembly 61, so as to have a substantial part of its length disposed in the path of the air discharge occurring through air discharge outlet 62. The coil has an inlet connection 106 (Figure 2) and has one or more lengths passing across the air discharge outlet 62, such portions of the coil as are subjected to the air discharge being preferably provided with heat radiating fins 107. It will be understood that if this air discharge outlet 62 is arranged to face in any one of the other directions illustrated in Figures 3, 4, 5 and 6, the one or more finned lengths of the precooling coil 105 will be so arranged as to be disposed in the line of air discharge from such outlet 62. This would also apply to a duct discharge, as well as to an atmospheric discharge. The top precooling coil 105 tends to condense any oil vapors which may be contained within the refrigerating gases, and the coil may also be constructed and operated in such manner as to remove a substantial part of the superheat from the refrigerating gases before the gases reach the main coil assembly 58. The discharge side of the top precooling coil 105 is connected through pipe 109 with an oil separator 111. The upper portion of this oil separator is connected laterally through connection 112 with an inlet manifold 113 extending horizontally across the inner side of the front end plate 33. Any accumulation of oil in the lower part of the oil separator 111 can be blown therefrom through an oil blow-off valve 114 having connection inside the separator with a depending blow-off or drain pipe 115. As shown in Figure 2, the coil assembly 58 comprises a plurality of vertically disposed tiers or banks of tubes having the back and forth stretches of the tubes in adjacent banks disposed in alternating relation. The lower ends of all of the tubes discharge into a lower manifold header 116 which is also secured to the inner surface of the front end plate 33. A liquid outlet pipe 117 discharges from the lower manifold 116, for conducting the condensed refrigerant from the unit.

Referring now to the spray system illustrated in Figures 1 and 2, in this instance I have illustrated a deflecting plate type of spray system which lends itself particularly well to use in evaporative condensers. The spray occurs from a spray header 121 extending substantially horizontally within the base pan 31 directly below the median center line of the coil assembly 58. Projecting upwardly from the top side of the header 121 at spaced distances are spray nozzles 122 which are disposed above the normal water level in the pan 31. These nozzles 122 are arranged to discharge substantially vertically up against deflecting plates 123 supported above the coil assembly 58. As shown in Figure 2, the two innermost tiers of the coil assembly are spaced apart to provide a vertical areaway 124 through which the spray can be projected upwardly from the nozzles against the deflecting plates without striking any of the adjacent coils of coil assembly 58. As shown in Figure 1, these deflecting or diffusing plates 123 are of channel cross-section having downwardly extending front and rear flanges, or are otherwise shaped to produce a distributed and directed atomization so that the finely atomized spray resulting from impingement of the high velocity water stream against such plates precipitates down over the coil assembly 58 in a distributed pattern so as to give a substantially uniform distribution or density of spray over a relatively large area of coil surface in the coil assembly. The spray apertures in the nozzles or jets 122 are so large that it is practically impossible for them to become clogged by suspended impurities carried through the water system. Furthermore, in view of the fact that the spray nozzles or jets point in an upward direction, it will be seen that when the spray system is shut down the drainage will occur in a downward direction through these spray apertures back into the spray header 121, rather than from the header out through the apertures, such as is the case when the spray apertures discharge downwardly or laterally. As shown in Figure 1, the far end of the header 121, remote from the pump end, is provided with a small downwardly opening bleeder hole 125 through which the header can drain when the spraying operation is shut down. Hence, the downward drainage which occurs back through the spray apertures 122 into the header 121 carries any foreign matter downwardly out of the spray apertures through the header and out through the bleed opening 125 to the normal water level disposed below the bleed opening. This end of the header is suspended from the coil assembly by a hanger 127 which lines up the header in proper relation to the coil assembly passageway 124 and plates 123. By virtue of these features, my improved spray system is virtually non-clogging, and it is also self-draining, so as to eliminate the possibility of freeze-up.

The water pump preferably consists of a centrifugal pump 128 mounted on a vertical axis within the pan 31. The pan projects beyond the front end plate 33 to define a zone or sump 131 for receiving the pump and straining screen. The pump is shown as being a part of a direct drive motor-pump unit wherein the motor 132 extends directly up from the pump and has mounting support either on the front end plate 33 or on any suitable frame structure carried by the pan 31. The intake of the pump 128 is submerged below the normal water level, and, if desired, the entire pump can be submerged below normal liquid level. This normal liquid level is maintained by a level responsive float 134 (Figure 2) which controls an inlet valve 135 through which inlet water can be admitted to the pan 31 for make-up purposes and for maintaining the desired liquid level in the pan.

Referring now to my improved straining screen, this screen, designated 133, is best illustrated in Figure 9, from which it will be seen that it extends diagonally of the front pan space 131, so as to divide this space or sump into a rear area 131a and a front area 131b. The spray water falling down through the coil assembly to the bottom of the cooling chamber passes forwardly through a plurality of water transfer openings 136 provided in the lower portion of the front end plate 33, the screen being so disposed that all of this water passing through these openings enters the rear area 131a. This water must then pass through the straining screen, in order to reach the front area 131b, in which front area is disposed the pump 128 for returning the water under pressure back to the spray header 121. It will hence be seen that the entire circulatory flow of the water must pass through this straining screen 133, and the location of this screen in the forward compartment 131 of the pan makes it immediately visible to the attendant walking past the front end of the unit, so that he can tell at any time if the screen needs cleaning. The cleaning merely requires the lifting of the screen out of this diagonal position. Guideways or guide channels 137 may be provided for holding the screen in its normal position.

In the evaporative condenser embodiment of my invention, sets of eliminator baffles 141 are provided in the chamber 52 above the coil assembly 58 and above the water diffusion plates 123. I preferably arrange these eliminator baffles for quick and easy removal from either one or both sides of the unit. Accordingly, when the unit is provided with these sets of eliminator baffles, the side cover sheets terminate a sufficient distance down from the top of the main frame to accommodate removable side panels or doors 143 through which the sets of baffles can be removed. As shown in Figure 1, the ends of the baffle sections clear the vertical marginal flanges 35, 35' of the two end plates 33, 33' to permit the convenient removal and replacement of the baffles when the side doors are removed. The baffle sections have slidable mounting on transversely extending angle bars 145 secured to the end plates 33, 33' or to other portions of the frame structure. The baffle sections are made sufficiently small, so that one man can easily remove and replace a baffle section without any additional assistance. This facilitates the frequent cleaning of the baffle sections.

In Figures 10 and 11, I have illustrated another embodiment of my invention, particularly adapted to the cooling of air by a spray of brine, water, or other air contact media. This latter embodiment follows the same basic design as that shown in Figures 1 and 2, except that it is of the two-fan size instead of the single fan size shown in Figures 1 and 2. The two fans 69, 69 are mounted upon the same fan shaft 71, these two fans being of the same size. The fan sub-assembly 61 is the same as previously described, except that it has longer longitudinal bars and longer cover sheets 85, 86, 86' to provide the greater length necessary for the two fans. As shown in Figure 10, I have illustrated the fan sub-assembly 61 turned end-for-end from the position shown in Figure 1. This disposes the electric motor 67 at the rear end of the unit, and disposes the two-fan discharge outlet 62 adjacent the left hand side of the unit (as viewed in Figure 11) instead of at the right hand side of the unit (as viewed in Figure 2).

Referring to the main frame construction, this two-fan size uses the same reenforced end plates 33, 33', but has a longer base pan 31 and longer longitudinal frame bars 42 and 44. The side cover sheets 48, 48 are also appropriately longer. The coil assembly 58a may be of any preferred type suitable for these spray types of air cooling units. The liquid spray media for contact with the air may consist of brine, water, or other suitable liquid, and this spray media is shown as being discharged from a spray header 151 extending longitudinally of the unit above the coil assembly 58a, this header having any conventional spray nozzles or jets 152. The same motor driven centrifugal pump 128 mounted in the liquid receiving pan 31 is employed for pumping this brine or other air contacting liquid from the pan up to the spray header 151, the pumped liquid being conducted to the header through pipe 153. If desired, the diffusion plate spray system illustrated in Figures 1 and 2 may be employed in this spray type of air cooling unit shown in Figures 10 and 11. The air to be cooled enters through the air inlet openings 51, 51 defined between the lower edges of the side sheets 48 and the adjacent top edges of the base pan 31, and this air flows upwardly between the turns of the coil assembly where it is in direct contact with the wetted surfaces of the coil and with the liquid spray media, so as to bring about a quick cooling of the air. This cooled air thence passes upwardly through the same arrangement of eliminator baffles 141 and out through the fans or blowers 69 to the duct system or to the zone adapted to utilize the cooled air.

The coil assembly 58a is preferably operated as a flooded system, but this is not essential. In the exemplary arrangement shown, the liquid refrigerant enters an accumulator or surge drum 161 through a float controlled valve 162 which is responsive to the action of a float operating within the accumulator drum. The hand controlled expansion by-pass valve connection 164 in shunt of the float controlled valve 162 is an optional feature. The liquid refrigerant flows down from the accumulator 161 through the vertical stand pipe 165 and enters the lower end of the left hand header 166 of the coil assembly (Figure 11). Inclined coils extend from this left hand header up to the right hand header 167, and connecting with the upper end of this right hand header is a gas return pipe 168 which leads to the upper portion of the accumulator drum 161. The top of the accumulator drum is connected to a gas return line 169 leading back to the compressor. By virtue of the action of the float controlled valve 162 the liquid refrigerant completely fills the coil assembly 58a, so that all the coils are entirely flooded up to the level established by this float controlled valve in the accumulator. As heat is extracted from the air passing upwardly in exterior contact with the coils, evaporation of the liquid refrigerant takes place in the coil assembly and the gas bubbles are carried over with the liquid into the accumulator 161, where the gas is separated from the liquid. The gas is permitted to pass back to the compressor through connection 169, and the entrained liquid refrigerant drops down through the accumulator and through the vertical liquid leg 165 and recirculates through the coil assembly.

My invention can also be embodied in a dry type of air cooling unit, employing either prime surface coils or finned coils. This dry type of unit is normally operated with the exterior surfaces of the coils in a dry state. Hence, it is not necessary to provide any recirculating type of liquid spray system. However, in this dry type of unit, I provide a spray header above the coil assembly for the purpose of defrosting the coil surfaces. The defrosting operation can be performed with brine, water, or the like, projected from this overhead spray header. This dry type of unit does not require the use of eliminator baffles. In other respects, it is substantially the same as the two embodiments previously described.

While I have illustrated and described what I regard to be the preferred embodiments of my invention, nevertheless it will be understood that such are merely exemplary and that numerous modifications and rearrangements may be made therein without departing from the essence of the invention.

I claim:

1. In cooling apparatus of the class described comprising a cooling chamber having a cooling coil assembly therein, and a fan above said chamber for drawing air upwardly therethrough in contact with said coil assembly, the combination of a base pan for receiving a liquid and affording a foundation for said cooling apparatus, a main frame structure adapted to be erected within said pan comprising two end plates supported in spaced relation upon the bottom of said pan with the bottom of said pan serving as a uniform supporting foundation for said end plates and the side walls of said pan preventing outward separation of the lower ends of said end plates, said end plates comprising metallic sheets having reenforced portions for stiffening the sheets vertically, longitudinal frame bars extending between and joining said end plates, said end plates defining the ends of said cooling chamber, and side cover sheets secured to said main frame structure for closing the sides of said cooling chamber, the lower edge of one of said side cover sheets being spaced from the adjacent side edge of said pan for defining an air inlet opening into the lower end of said cooling chamber, said coil assembly within said cooling chamber being carried by said end plates, and said fan means at the upper end of said cooling chamber for drawing air upwardly therethrough being also carried by said end plates.

2. In apparatus of the class described, the combination of a base pan for receiving a liquid, main frame structure adapted to be erected within said pan comprising two end plates supported in spaced relation upon the bottom of said pan, said end plates comprising metallic sheets having reenforced portions for stiffening the sheets vertically, longitudinal frame bars extending between and joining said end plates, said end plates defining the ends of a cooling chamber, side cover sheets secured to said main frame structure for closing the sides of said cooling chamber, the lower edge of one of said side cover sheets being spaced from the adjacent side edge of said pan for defining an air inlet opening into the lower end of said cooling chamber, a coil assembly within said cooling chamber, and a fan subassembly disposed at the top of said main frame and supported entirely by said two end plates, said fan sub-assembly comprising a rectangular sub-frame, a fan therein, and an electric motor therein operatively connected to drive said fan, said fan comprising an inlet adapted to draw air up through said chamber and an outlet adapted to discharge the air therefrom, said sub-assembly being turnable end-for-end in its mounting on said main frame so as to locate the fan outlet in a selected one of different fixed positions relative to the upper portion of the apparatus.

3. In apparatus of the class described comprising a chamber having an air inlet in its lower portion and a coil assembly in said chamber, the combination therewith of a motor-driven fan unit mounted on the upper portion of said chamber adapted to draw air up through said chamber and coil assembly and to discharge the air through a discharge outlet, said motor-driven fan unit being mountable in any selected one of different fixed positions on said chamber so as to dispose said discharge outlet in different fixed positions.

4. In apparatus of the class described, the combination of a spray chamber, a coil assembly in said spray chamber comprising laterally spaced vertical tiers of coils having a vertical areaway therebetween, a spray header disposed adjacent the bottom of said coil assembly and having upwardly directed nozzles discharging streams of liquid upwardly in said vertical areaway, and diffusion plates above said coil assembly against which the liquid streams are adapted to impinge for scattered diffusion down over said coil assembly.

5. In apparatus of the class described, the combination of a spray chamber, a coil assembly in said spray chamber comprising laterally spaced vertical tiers of coils having a vertical areaway therebetween, a spray header disposed adjacent the bottom of said coil assembly and having upwardly directed nozzles discharging streams of liquid upwardly in said vertical areaway, diffusion plates above said coil assembly against which the liquid streams are adapted to impinge for scattered diffusion down over said coil assembly, said diffusion plates having recessed or concave under surfaces for producing a desired pattern of spray distribution over said coil assembly, a liquid collecting pan below said spray chamber for receiving the spray precipitated down from said coil assembly, pump means for recirculating the liquid from said pan to said header, and a drainage bleeder in said header for draining said header into said pan when the spray system is shut down.

6. In an evaporative condenser, the combination of a single pass spray chamber having an air inlet at its lower end, a main condensing coil in said chamber, means for spraying liquid over said coil, a fan adapted to circulate air up through said spray chamber to have direct contact with the sprayed surfaces of said main condensing coil and thence to be discharged through a discharge outlet at the top of said chamber, and a precooling coil extending across said discharge outlet of the fan in position to be subjected to the impingement of the air from said spray chamber after such air has absorbed heat from said fan, said precooling coil being connected to receive the refrigerating gases in advance of said main condensing coil.

7. In apparatus of the class described comprising a chamber having a heat transfer coil therein and a fan above said chamber for drawing air upwardly through said chamber in contact with said coil, the combination of a base pan, a pair of end plates erected in spaced relation in said base pan to define the end walls of said chamber, said pan serving as a foundation and laterally confining anchorage for said end plates, said end plates having inwardly extending stiffening flanges along their vertical edges and inwardly extending gusset plates in spaced relation to said flanges to define pockets therebetween, longitudinally extending side angle bars connected between said end plates to hold the latter upright in said base pan, the ends of said side angle bars fitting into said pockets and being secured to said gusset plates, side cover plates secured to said end plates to define the side walls of said chamber, and an air inlet opening into the lower part of said chamber, said heat transfer coil in said chamber being carried by said end plates through said longitudinally extending side angle bars, and said fan above said chamber being also carried by said end plates.

8. In spray type cooling apparatus of the class described, the combination of a spray chamber housing having an air inlet at its lower end, a coil assembly in said spray chamber, spray means for spraying a liquid over said coil assembly, fan means for circulating air through said air inlet and up through said spray chamber in contact with said coil assembly, removable eliminator baffles disposed substantially horizontally above said coil assembly, horizontally extending supporting guide members extending transversely of said housing above said coil assembly on which said eliminator baffles are slidably mounted, and a releasable closure in the side wall of said housing through which said eliminator baffles are adapted to be removed by sliding them horizontally on said guide members and outwardly through the side of said housing.

9. In an evaporative condenser, the combination of a base pan, a spray chamber housing erected in said base pan comprising reenforced end plates defining the ends of said spray chamber, longitudinal bars joining said end plates, and side cover sheets defining the sides of said spray chamber, a coil assembly in said spray chamber, spray means for spraying water over said coil assembly, air intake openings for said spray chamber between said pan and the lower edges of said side cover sheets, eliminator baffles above said coil assembly, a fan above said spray chamber for drawing air through said air intake openings and up through said spray chamber, said fan having a discharge outlet, a precooling coil for the refrigerating gases extending across said fan discharge outlet above said eliminator baffles so that said precooling coil is thermally influenced by the air after it is passed through said eliminator baffles and through said fan, and an oil separating chamber connected between said precooling coil and said coil assembly.

10. In apparatus of the class described, the combination of a base pan, a spray chamber housing erected in said base pan comprising reenforced end plates defining the ends of said spray chamber, and side cover sheets defining the sides of said spray chamber, a coil assembly in said spray chamber, spray means for spraying a liquid over said coil assembly, outwardly inclined baffles on the side edges of said pan and inwardly inclined baffles at the lower edges of said cover sheets defining therebetween high velocity air intake openings for the lower end of said spray chamber, a fan sub-assembly mounted on top of said spray chamber housing for drawing the air up therethrough, said fan sub-assembly comprising a sub-frame, an electric motor in said sub-frame, a blower in said sub-frame driven thereby, and means mounting said blower in said sub-frame enabling said blower to be rotated to different positions therein for disposing the blower outlet at different angles of discharge, said sub-frame also being turnable end-for-end in its mounting on said spray chamber and being rotatable in said mounting about an axis parallel with the axis of said blower for disposing the blower outlet in different positions of discharge.

11. In apparatus of the class described, the combination of a base pan for collecting spray liquid, a spray chamber housing erected in said pan comprising two sheet metal end plates resting on the bottom of said base pan in spaced relation and defining the two end walls of said spray chamber, said end plates having reenforced or stiffened vertical edges, longitudinal frame bars extending between and joining said end plates, side cover sheets secured to said end plates to define the side walls of said spray chamber, the lower edges of said side cover sheets being spaced from the adjacent side edges of said pan to define air inlets opening into the lower portion of said spray chamber, a coil assembly in said spray chamber, spray nozzles for spraying a liquid over said coil assembly, said base pan projecting beyond one end of said spray chamber housing to form an end sump for receiving return spray liquid, a pump drawing said return liquid from said end sump and pumping it to said nozzles, a removable straining screen in said end sump for screening the return liquid before it reaches said pump, transversely extending guide rails in said spray chamber above said coil assembly, removable eliminator baffles slidably mounted on said guide rails, releasable closure means in the side wall of said spray chamber for permitting easy removal of said eliminator baffles, and a fan sub-assembly mounted on said spray chamber above said eliminator baffles for drawing air up through said spray chamber and baffles, said fan sub-assembly comprising a substantially rectangular sub-frame, an electric motor therein, a blower in said sub-frame driven by said motor, and removable cover sheets for the different sides of said sub-frame, said fan sub-assembly being capable of mounting in different end-for-end positions on said spray chamber for disposing the blower outlet in different positions, said fan sub-assembly also being capable of mounting in different rotated positions so as to present different sides of said sub-frame as a lowermost side resting on said spray chamber whereby to dispose the fan outlet in different positions, said removable cover sheets being then transposed to cover the other sides than said lowermost side.

12. In apparatus of the class described, the combination of a base pan for collecting spray liquid, a spray chamber housing erected in said pan comprising two sheet metal end plates resting on the bottom of said base pan in spaced relation and defining the two end walls of said spray chamber, said end plates having reenforced or stiffened vertical edges, longitudinal frame bars extending between and joining said end plates, side cover sheets secured to said end plates to define the side walls of said spray chamber, the lower edges of said side cover sheets being spaced from the adjacent side edges of said pan to define air inlets opening into the lower portion of said spray chamber, a coil assembly in said spray chamber, upwardly directed spray nozzles disposed approximately below said coil assembly, diffusion targets above said coil assembly against which said nozzles direct streams of spray liquid for scattered diffusion down over said coil assembly, said base pan projecting beyond one end of said spray chamber housing to form an end sump for receiving return spray liquid, means for maintaining a substantially constant liquid level in said sump, a pump substantially submerged in said sump below said liquid level to be self-priming and to avoid injury in the event of freezing, said pump drawing return liquid from said end sump and pumping it to said nozzles, a removable straining screen in said end sump for screening the return liquid before it reaches said pump, transversely extending guide rails in said spray chamber above said coil assembly, removable eliminator baffles slidably mounted on said guide rails, releasable closure means in the side wall of said spray chamber for permitting easy removal of said eliminator baffles, and a fan sub-assembly mounted on said spray chamber above said eliminator baffles for drawing air up through said spray chamber and baffles, said fan sub-assembly comprising a substantially rectangular sub-frame, an electric motor therein, a blower in said sub-frame driven by said motor, and removable cover sheets for the different sides of said sub-frame, said fan sub-assembly being capable of mounting in different end-for-end positions on said spray chamber for disposing the blower outlet in different positions, said fan sub-assembly also being capable of mounting in different rotated positions so as to present different sides of said sub-frame as a lowermost side resting on said spray chamber whereby to dispose the fan outlet in different positions, said removable cover sheets being then transposed to cover the other sides than said lowermost side.

13. In an evaporative condenser, the combination of a housing defining a spray chamber therein, a coil assembly in said spray chamber, spray means for spraying water over said coil assembly, eliminator baffles above said coil assembly, a fan above said spray chamber for drawing air up through said coil assembly and through said eliminator baffles, said fan having a discharge outlet, and a precooling coil for the refrigerating gases extending across said fan discharge outlet above said eliminator baffles so that said precooling coil is thermally influenced by the air after it has passed through said eliminator baffles and through said fan, said precooling coil being connected with said coil assembly and receiving the refrigerating gases in advance of said coil assembly.

JOHN R. BOYLE.

References Cited in the file of this patent

UNITED STATES PATENTS

| Number | Name | Date |
| --- | --- | --- |
| 848,224 | Clough | Mar. 26, 1907 |
| 1,653,407 | Ogden | Dec. 20, 1927 |
| 1,695,527 | Braun | Dec. 18, 1928 |
| 1,861,158 | Hilger | May 31, 1932 |
| 2,038,536 | Bulkeley | Apr. 28, 1936 |
| 2,120,767 | Raver | June 14, 1938 |
| 2,200,442 | Crawford | May 14, 1940 |
| 2,213,622 | Carraway | Sept. 3, 1940 |
| 2,228,484 | Ramsaur | Jan. 14, 1941 |
| 2,297,928 | Wilson | Oct. 6, 1942 |
| 2,349,668 | Marker | May 23, 1944 |
| 2,379,932 | Schoepflin | July 10, 1945 |
| 2,498,017 | Stutz | Feb. 21, 1950 |
| 2,501,518 | Horton | Mar. 21, 1950 |